United States Patent [19]

Kau

[11] Patent Number: 5,067,084

[45] Date of Patent: Nov. 19, 1991

[54] INERTIAL MEASUREMENT UNIT WITH AIDING FROM ROLL ISOLATED GYRO

[75] Inventor: Shing P. Kau, Seminole, Fla.

[73] Assignee: Honeywell Inc., Minneapolis, Minn.

[21] Appl. No.: 357,383

[22] Filed: May 25, 1989

[51] Int. Cl.$^5$ .................................. G06F 15/50
[52] U.S. Cl. ........................ 364/453; 364/454;
74/5.34; 73/178 R; 73/510
[58] Field of Search ............... 364/453, 454, 571.01,
364/571.05, 443, 450, 571, 434, 423, 460, 174,
107, 449, 559, 111, 422; 73/510, 511, 514, 517
R, 518, 178 R, 488, 504, 151, 505; 33/316–325;
318/649

[56] References Cited

U.S. PATENT DOCUMENTS

| | | | |
|---|---|---|---|
| 3,940,597 | 2/1976 | Di Matteo | 364/454 |
| 3,992,106 | 11/1976 | Auerbach | 356/144 |
| 4,106,094 | 8/1978 | Land | 364/453 |
| 4,222,272 | 9/1980 | Mairson | 364/453 |
| 4,275,861 | 6/1981 | Hubert | 244/165 |
| 4,371,921 | 2/1983 | Cushman | 364/453 |
| 4,437,047 | 3/1984 | Smay | 318/649 |
| 4,537,067 | 8/1985 | Sharp et al. | 73/151 |
| 4,583,178 | 4/1986 | Ameen et al. | 364/453 |
| 4,675,820 | 6/1987 | Smith et al. | 364/453 |
| 4,711,125 | 12/1987 | Morrison | 73/510 |
| 4,758,959 | 7/1988 | Thoone et al. | 73/178 R |
| 4,800,501 | 1/1989 | Kinsky | 364/453 |
| 4,823,626 | 4/1989 | Hartmann et al. | 364/453 |
| 4,841,773 | 6/1989 | Stewart | 73/510 |

OTHER PUBLICATIONS

Sensor Mounted Inertial Measurement System by E. J. Kroman, Jun. 1973.
A Multi–DME/Inertial System for Aircraft Positioning by R. W. Latham and P. T. Richards, Spring, 1977.

*Primary Examiner*—Michael R. Fleming
*Assistant Examiner*—Ayaz Sheikh
*Attorney, Agent, or Firm*—Robert A. Pajak

[57] ABSTRACT

In the present invention the inertial measurement unit system comprises a basic strapdown inertial measurement unit and an isolated fourth gyro strapped to a rotatable platform which is commanded to rotate at a rate equal to the spin rate of the vehicle body but in an opposition direction. The rotatable platform is controlled substantially by a control signal to cause the rotatable platform to turn at a rate substantially equal to the roll of the vehicle body but in an opposite direction. A signal processing means operates on (i) the output of an inertial navigational system computer representative of the rate of rotation of the inertial measurement unit along the roll axis, (ii) the output of the isolation gyro, and (iii) an output of a counter which counts the complete revolutions of the rotatable platform. In turn, an error signal is provided which is related to the rotation measurement error of the first rotation signal. In turn the error signal is fed into the navigational system computer for correction of the navigational system data for correcting that data affected by scale factor stability of the roll gyro of the inertial measurement unit.

3 Claims, 2 Drawing Sheets

5,067,084

INERTIAL MEASUREMENT UNIT WITH AIDING FROM ROLL ISOLATED GYRO

BACKGROUND OF THE INVENTION

The present invention relates to a strapped down inertial measurement system.

Space reentry vehicles are intentionally caused to spin at high spin rates during portions of the flight mission in order to provide vehicle body stability. Such applications impose stringent requirements on inertial measurement units which include rotation and acceleration sensors. Specifically, such applications impose stringent requirements on the rotation sensors, particularly the rotation sensor generally aligned with the axis about which the vehicle body spins for stabilization. More specifically, stringent requirements are imposed on the scale factor stability of the roll gyro. This is so since scale factor error in the roll gyro will ripple through the resultant attitude data derived from all three gyros including the roll gyro.

Generally, in order to provide gyros which satisfy the stringent requirements on scale factor stability, the roll gyros are particularly tested for scale factor stability at high spin rates. Only those gyros which meet the stringent scale factor stability criteria are than selected for the roll gyro of a particular inertial measurement unit.

BRIEF DESCRIPTION OF THE INVENTION

It is an object of the present invention to provide an inertial measurement unit system in which the stringent requirements for scale factor stability are reduced.

In the present invention the inertial measurement unit system comprises a basic strapdown inertial measurement unit and an isolated fourth gyro placed on a rotatable platform which is commanded to rotate at a rate equal to the spin rate of the vehicle body but in an opposite direction.

In the present invention the inertial measurement unit system computer provides a roll rotation signal representative of the rate of rotation of the inertial measurement unit along the vehicle body roll axis. A signal processing means operates on the (i) roll rotation signal, (ii) the output of the isolation gyro, and (iii) the output of a counter which counts the complete revolutions of the rotatable platform. In turn, the signal processing means provides an error signal which is related to the rotation measurement error of the roll rotation signal. The error signal is fed back into the navigational system computer for correcting the navigational system data affected by scale factor error of the roll gyro of the inertial measurement unit.

DESCRIPTION OF THE INVENTION

Figure 1:
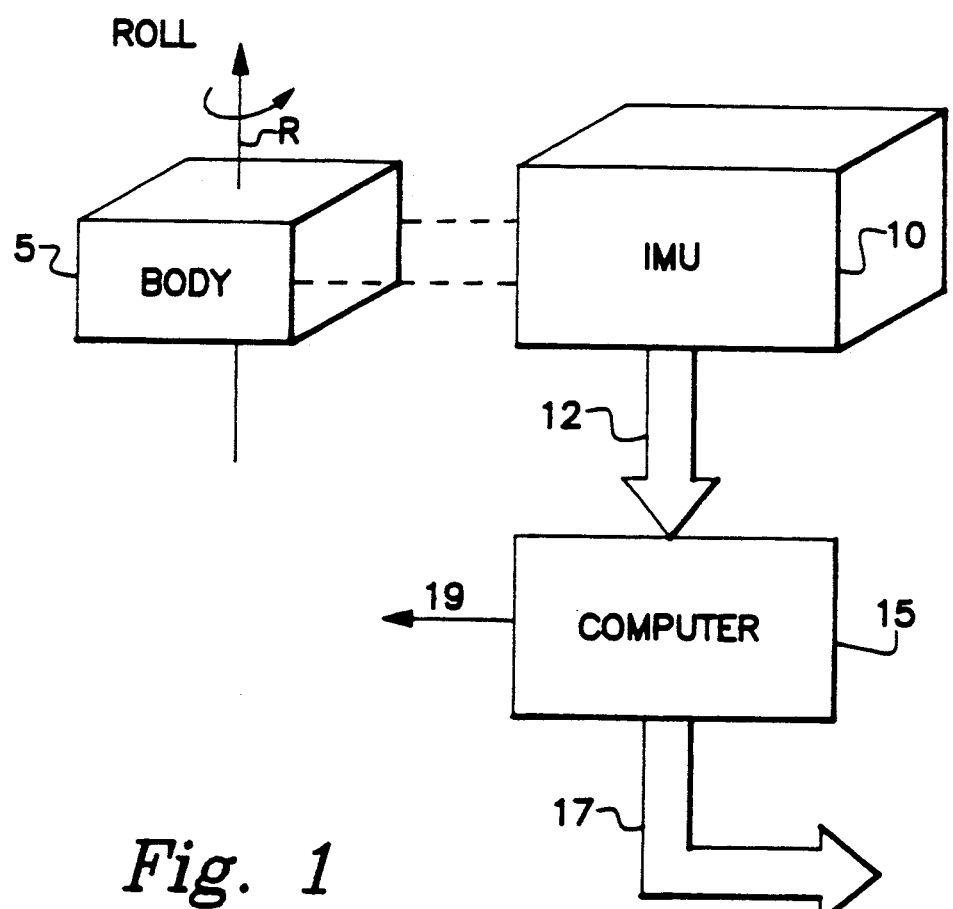
FIG. 1 is a block diagram of an inertial navigation system.

Referring to FIG. 1, there shown is a block diagram of an inertial navigation system well known in the art. The inertial navigation system comprises an inertial measurement unit (IMU) 10 generally comprising three rotation sensors and three acceleration sensors (not shown). The rotation sensors are herein referred to as gyros, and may be of any variety including spinning mass gyros, ring laser gyros, or fiber optic gyros, and the like. Acceleration sensors may be provided by a wide variety of accelerometers well known in the art. Both the rotation sensors and acceleration sensors are generally configured to provide sufficient rotation and acceleration information to determine the attitude of body 5. For strapdown inertial measurement systems, the IMU 10 ia rigidly attached (i.e., strapdown) to a vehicle body 5.

IMU 10 provides rotation and acceleration data 12 to an inertial navigation system computer 15. In turn, the strapdown inertial navigation system computer provides attitude reference data such as acceleration, velocity, rotation, and position information of the body as indicated by data outflow 17. Further, the inertial navigation system computer 15 may also provide an output signal representation of the amount of rotation, i.e. "roll", of the vehicle body 5 along a chosen roll-axis on signal line 19 and represented by the quantity $G_R$.

Generally, the IMU 10 includes rotation and acceleration sensors having input axes along three mutually exclusive orthogonal axes. Specifically IMU 10 generally includes a first gyro having its input axis in parallel with the roll axis "R".

As described earlier, in some projectile applications, the body is made to spin at high rotation rates along the roll axis for a portion of the flight mission. In these applications, the roll gyro is subjected to high spin rates. Since the gyro scale factor is needed to compute the roll rate from the roll gyro measurement, the precision of the scale factor of the roll gyro is very important. Thus, the spin gyro becomes the most expensive gyro since it has the tightest specification for scale factor.

Figure 2:
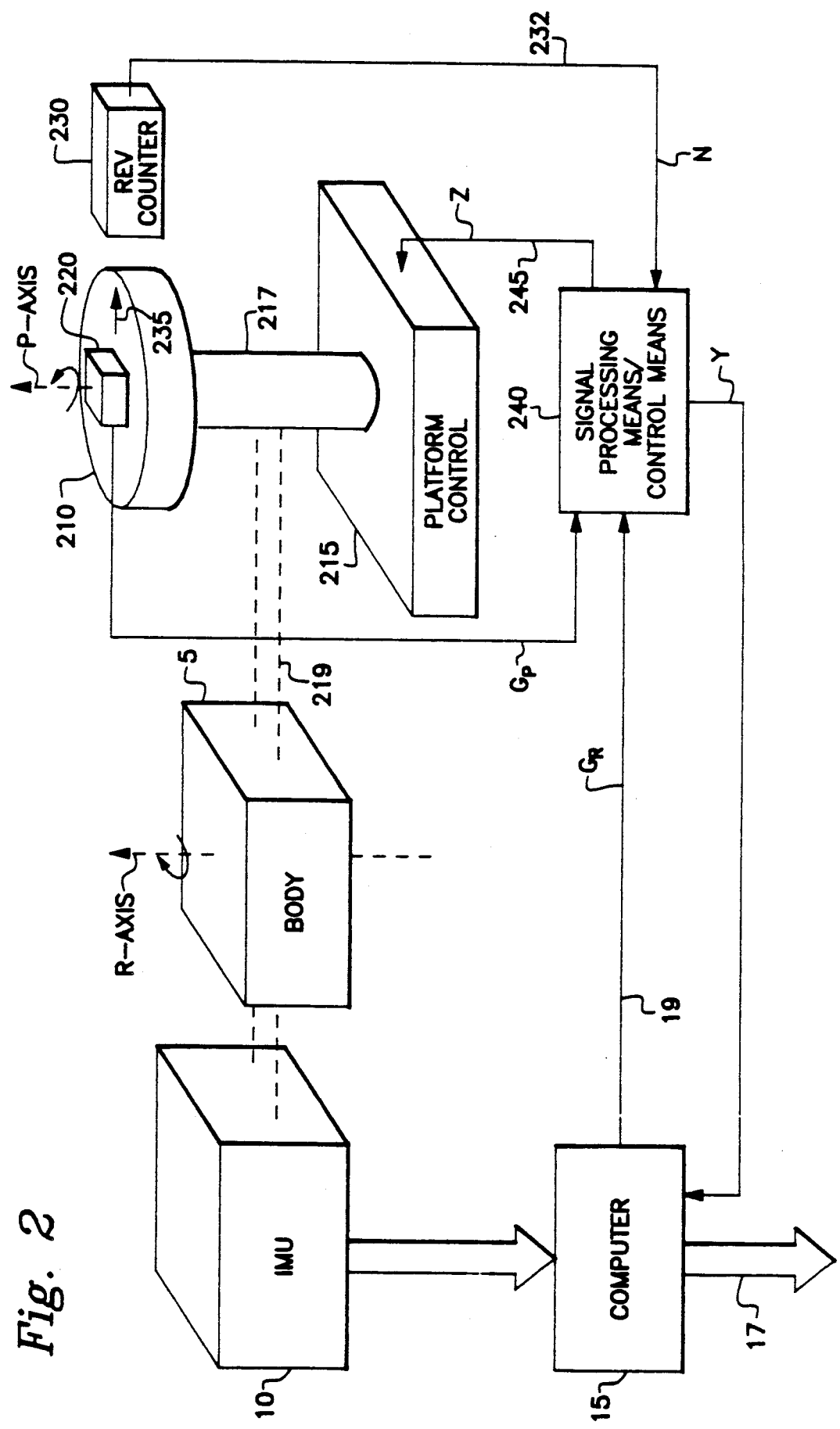
FIG. 2 is a block diagram of an inertial navigational system of the present invention.

FIG. 2 is a block diagram in accordance with the present invention. Those blocks having the same intended function as those in FIG. 1 are illustrated in FIG. 2 having the same numeral designations.

Referring now to FIG. 2, thereshown is body 5 and IMU 10, computer 15 as particularly described in FIG. 1. Further shown in FIG. 2 is a rotatable platform 210 which is rotatable about the rotatable platform rotation axis identified as "P-axis". The rotation, both magnitude and direction of the rotatable platform is controlled by a rotatable platform control means 215. Rigidly secured to rotatable platform 210 is an "isolation gyro" 220 having its input axis aligned with the P-axis.

Platform control means 215 generally includes a motor (not shown) for coupling motion to rotatable platform 210 through a rotating shaft 217. The combination of rotatable platform 210, shaft 217 and platform control means 215 are illustrated as rigidly coupled to body 5 through coupling means 219. Thus, it is intended that the P-axis of the rotatable platform is rigidly fixed relative the R-axis of body 5. Generally, it is intended that the P-axis is oriented in parallel with the R-axis of the vehicle body 5 within three arc-min, and have a stability in the order of 1 to 3 arc-sec.

Gyro 220 provides an output signal $G_P$ representative of the rotation sensed along the gyro 220 input axis. Since the isolation gyro 220 input axis is in parallel with the P-axis, and that the rotatable platform is rigidly coupled to body 5, the isolation gyro will sense the sum rotation of the body along the R-axis with the induced rotations of the rotatable platform 210.

Further included in FIG. 2 is a revolution counter 230 for counting complete revolutions of rotatable platform 210. Revolution counter 230 provides an output on signal line 232 representative of the number of complete revolutions of rotatable platform 210 identified by signal "N". Graphically illustrated in FIG. 2 is an index marker 235 to facilitate the counting. There are of course a wide variety of techniques of counting the revolutions of rotatable platform 210.

Further shown in FIG. 2 is control means 240 having as its in (i) signal $G_P$, the output of the isolation gyro 220, and (ii) signal $G_R$, the output of computer 15 representative of the roll of body 5. Control means 240 provides a control signal Z on signal line 245 as an input to platform control means 215 for controlling the rotation rate of platform 210. Control means 240 is intended to provide control signal Z to cause platform control 215 to rotate rotatable platform 210 at the same rate magnitude as body 5 about the R axis, but in an opposite sense. Control means 240 may include analog or digital circuitry providing the control loop as just described in a well known manner.

It is of paramount importance in the understanding of the present invention that when rotatable platform 210 is rotating at the same rate, but in an opposite sense as body 5 is rotating about the R-axis, the output signal $G_P$ will be substantially near zero. With the isolation gyro operating near the zero rotation operating point, the output of the isolation gyro will be insensitive to scale factor errors. Thus, a stringent scale factor requirement is not required of the isolation gyro. This will be more particularly discussed below.

Also shown in FIG. 2 is a signal processing means 240 having as its inputs (i) signal $G_P$, the output of the isolation gyro 220, (ii) signal $G_R$ the output of computer 15 representative the roll of body 5, and (iii) signal N, the output of revolution counter 230.

Signal processing means 240 is intended to combine signals $G_P$, $G_R$, and N to provide an error signal Y which is presented as an input to computer 15. Signal processing means 240 provides error signal Y related to the rotation measurement error of the roll gyro contained in the IMU 10 which is subjected to high spin rates as compared with the output of the isolation gyro 220 which observes only rotation near zero. Again, this is so since gyro 220, fixed to rotatable platform 210, is rotated at a rate equal to the rate of roll body 5 but in opposite direction.

Error signal Y is intended to be presented to computer 15 for correcting the output of the roll axis information which computer 15 utilizes in the determination of the navigation data 17 and roll information $G_R$. It should be understood that the navigation data 17 is only as good as the scale factor of the roll gyro at the high input spin rates. In practice of the present invention, the roll gyro of the inertial measurement unit may be one having less stringent scale factor requirement since the roll gyro can be corrected by the error signal Y by use of the isolation gyro information.

The operation of the present invention in accordance with FIG. 2 will now be described. The isolation gyro rate $G_P$ may be described as follows:

$$G_P = P_r + B_r \quad (1)$$
where $G_P$ = the output of isolation gyro 220 indicative of the net rotation about its input axis aligned with the P-axis.

$P_r$ = the platform rotation rate, and $B_r$ = the body roll rate about R-axis

In turn, the error signal Y may be expressed as follows:

$$Y = 2\pi N - G_P - G_R \quad (2)$$

By inspection of equation (2), if there is no scale factor errors, then $G_P$ is zero, and the total number of complete revolutions of rotatable platform 210 will be exactly equal to the output of the gyro roll axis $G_R$. Therefore, there would be no rotation incremental error (i.e., angular error) processed by computer 15.

However, assuming there is error in the gyro output $G_R$, then the error signal Y represents the error in the scale factor in the roll gyro of the IMU. Control means 240 operates in a manner to provide output signal Z to control the rotation rate of the controllable platform such that $G_P + G_R$ is always driven toward zero, i.e., $G_P$ is drive to have the same magnitude but opposite direction as $G_R$.

Computer 15 may operate utilizing the error signal Y in a manner to correct the roll gyro output information. For example, one may utilize an error model as follows. The state vector equation for an aiding filter may be defined as:

$$X = [\Delta \alpha^{I1}, \Delta \alpha^{I2}, \Delta \alpha^{I3}, Y_1, \Delta r_0] \quad (3)$$
where $\Delta \alpha^{I1}, \Delta \alpha^{I2}, \Delta \alpha^{I3}$ are the attitude error in inertial frame,
$Y_1$ is the $G1$ gyro scale factor error,
$\Delta r_0$ is the initial revolution counter error.

The attitude error propagation is governed by the equation:

$$d(\Delta \alpha^{I1})/dt = T^{I1}{}_{G1} * \omega^{G1} * Y_1$$

$$d(\Delta \alpha^{I2})/dt = T^{I2}{}_{G1} * \omega^{G1} * Y_1$$

$$d(\Delta \alpha^{I3})/dt = T^{I3}{}_{G1} * \omega^{G1} * Y_1$$

where $T^{I1}{}_{G1}, T^{I2}{}_{G1}, T^{I3}{}_{G1}$ are the direction cosines projecting $G_1$ input axis to $I_1$, $I_2, I_3$ axes respectively, $\omega^{G1}$ is the angular rate measured by gyro $G_1$, The gyro scale factor error and the initial revolution counter error are modeled as constant states, i.e., $$d(\Delta S_1)/dt = 0$$

$$d(\Delta r_0)/dt = 0$$

In terms of matrix notations the state dynamics equation can be written combining equations (1), (2), and (3):

$$d(X)/dt = \begin{bmatrix} 0 & 0 & 0 & T^{J1}{}_{G1} * \omega^{G1} * 0 \\ 0 & 0 & 0 & T^{J2}{}_{G1} * \omega^{G1} * 0 \\ 0 & 0 & 0 & T^{J3}{}_{G1} * \omega^{G1} * 0 \\ 0 & 0 & 0 & 0 & 0 \\ 0 & 0 & 0 & 0 & 0 \end{bmatrix} X = AX$$

where A is the state dynamics matrix.

Of course, further refinements to the error signal analysis given above as well as to the behavior of signal processing means 240 are within the spirit and scope of the present invention. For example, signal processing means 240 may utilize a Kalman filter operative on past and present values of the error signal to provide a filtered error signal Y.

Thus, it should be recognized by those skilled in the art that the operation of the inertial measurement system of the present invention simply requires the isolation gyro to be rotated on a rotatable platform in an opposite direction to the actual roll of a vehicle body. The revolution counter and the roll isolation signals enable the use of relatively low performance isolation gyro to achieve high precision scale factor calibration of the roll gyro and the overall inertial navigational system.

It should be understood that the isolation gyro 220 may not need be operational during situations in which the roll of the vehicle body is relatively slow and that the scale factor of the roll gyro is sufficient. This relieves any long term stability requirements on rotatable platform 220. Thus, the primary benefit of the present invention is its use in vehicle bodies having high spin rates, particularly high spin rates for vehicle body stabilization. The isolation gyro, isolated from the high spin rate permits utilization of much less accurate roll gyros in the inertial measurement unit package 10, as well as the isolation gyro, and thus provides an overall lower cost to the inertial navigational system.

Generally, the present invention is particularly suitable for ring laser gyros. However it is within the spirit and scope of the present invention to use an IMU comprised of any type of gyro or accelerometer.

Generally, the IMU is intended to have a roll gyro strapped to the vehicle body and oriented such that the roll gyro input axis is parallel with the roll axis of the vehicle body. Appropriate system error analysis may then utilize the error signal Y to correct for high spin rate error of the IMU.

The embodiments of an invention in which an exclusive property or right is claimed are defined as follows:

1. An inertial measurement apparatus comprising:
    an inertial measurement unit having at least a first rotation sensor for providing a first rotation signal indicative of rotation of a vehicle body about a first axis, said first rotation sensor being rigidly secured relative to said vehicle body;
    a rotatable platform having a platform rotation axis;
    a platform control means for controlling the rate of rotation of said rotatable platform about said platform rotation axis, and in which the axis is substantially in parallel with such vehicle body axis in response to a first control signal;
    a second rotation sensor originally fixed to said platform, said second rotation sensor having a sensing input axis substantially in parallel with such vehicle body axis, said second rotation sensor further providing a second rotation signal indicative to rotation of said second rotation sensor about said platform rotation axis;
    means for counting complete revolutions of said rotatable platform and providing a count signal representative of said complete revolutions;
    signal processing means responsive to said first rotation signal and said second rotation signal to provide said first control signal such that said rotatable platform turns at a rate of rotation substantially equal to said rotation of said vehicle body about said first axis, but in an opposite direction; and
    said signal processing means for generating an error signal as a function of said first rotation signal, said second rotation signal, and said count signal, and said error signal being related to rotation measurement error of said first rotation signal due to high spin rates of said inertial measurement apparatus.

2. The apparatus of claim 1 in which said control includes a Kalman filter operative for providing a filtered error signal.

3. The apparatus of claim 1 further comprising means for generating attitude information of said vehicle body as a function of said first rotation sensor corrected by said error signal.

* * * * *

UNITED STATES PATENT AND TRADEMARK OFFICE
CERTIFICATE OF CORRECTION

PATENT NO. : 5,067,084

DATED : November 19, 1991

INVENTOR(S) : SHING P. KAU

It is certified that error appears in the above-identified patent and that said Letters Patent is hereby corrected as shown below:

Column 6:

Claim 1, Line 12, delete "a".

Claim 2, Line 39, delete "control" and insert

--signal processing means--.

Signed and Sealed this

Twenty-third Day of March, 1993

Attest:

STEPHEN G. KUNIN

Attesting Officer

Acting Commissioner of Patents and Trademarks